Sept. 3, 1940.　　　　M. G. SLAWSON　　　　2,213,416
POULTRY FEEDER
Filed Sept. 15, 1938

Inventor
Marion G. Slawson

By Shepherd & Cauthell

Attorney

Patented Sept. 3, 1940

2,213,416

UNITED STATES PATENT OFFICE 2,213,416

POULTRY FEEDER

Marion G. Slawson, Girard, Kans.

Application September 15, 1938, Serial No. 230,107

2 Claims. (Cl. 119—61)

The object of the present invention is to provide an improved type of poultry feeder, adapted to be manufactured from stamped sheet metal while incorporating such features of construction as to yield a feeder that may be adjustable in height so that it may be raised to accommodate the size of the growing poultry and will have its base automatically widened by the act of raising the same, to thereby more effectually resist any tendency of the feeder to overturn as the larger sized chicks try to hop upon it.

It is a further object of the invention to provide a feeder of this general character, constructed with an elliptically shaped trough in cross section so that all the feed can be secured by the chickens, yet they cannot bill or rake the feed out of the trough of the feeder.

A further object of the invention is to provide a feeder of this character in which the several parts are so shaped as to mutually inter-support and brace each other, while leaving no sharp edges about the structure which would be likely to injure the chicks and no longitudinal crevices or corners within the trough in which food will permanently lodge to become moldy or foul.

A further object of the invention is to provide a narrow longitudinal top opening in the feeder trough so that dirt and litter, as it is scratched about by chicks and larger poultry, may be less likely to enter the feed trough to contaminate the feed contained therein. Further objects and advantages of the invention will be set forth in the detailed description which follows.

In the accompanying drawing.

Like numerals designate corresponding parts throughout the several views.

Figure 1:
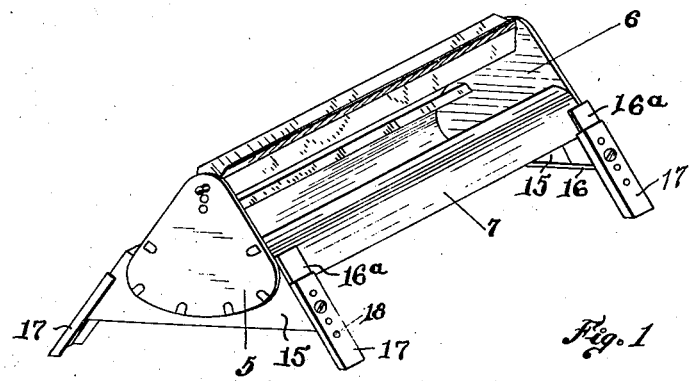
Figure 1 is a perspective view of the feeder of the present invention.

The feeder of the present invention is made up of a pair of ends 5 and 6, and a connecting trough 7. As will be seen by referring to Fig. 2, this trough is ovaloid in cross section, and is provided with a pair of inturned flanges 8, upon the opposite sides of the feeding opening 9, through which the chickens reach the feed placed within the trough.

The ends 5 and 6 are, as a whole, of generally triangular formation, and the material of which they are formed is so pressed as to form flanges 10, which constitute seats for the reception of the ends of the trough 7. The trough 7 is provided at its ends with tongues 11, which pass through the respective ends and are bent over and into shallow recesses formed by the indenting of the material of the ends 5 and 6 as indicated at 5ª.

The tongues 11, when bent over, tie the oval trough 7 to the ends 5 and 6, there being a sufficient number of these tongues to provide a tight and rigid construction. A reel 12 is provided with headed rivets or studs 13 at its ends, adapted to be snapped through openings 14, formed in the ends 5 and 6. There may be as many of these openings in a vertical row as desired. For purposes of illustration, I have shown three such openings in each end, and these openings provide for vertical adjustment of the reel with respect to the trough 7.

It is common practice to provide longitudinally extending reels mounted to turn above the tops of poultry feeders for the purpose of discouraging the roosting of chickens upon the feeder.

The stamping of the ends 5 and 6 to provide the flanges 10 results in the formation of webs 15, which terminate in inturned horizontal stiffening flanges 16 at their lower edges. Legs 17, of channel iron formation, are each provided with a vertical row of openings 18, said channel-like legs fitting over flanges 16ª, the outer faces of which lie at an inclination as illustrated in Fig. 2, said flanges 16ª being constituted by inturned portions at the sides of the webs 15.

Figure 2:
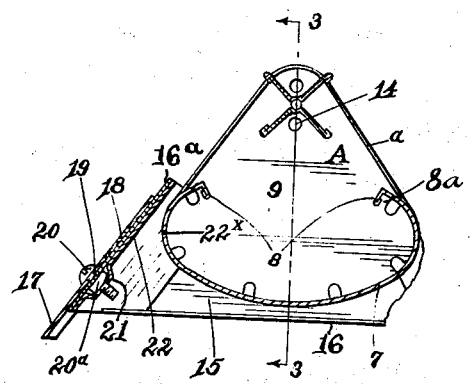
Fig. 2 is a transverse sectional view upon line 2—2 of Fig. 3.
Figure 3:
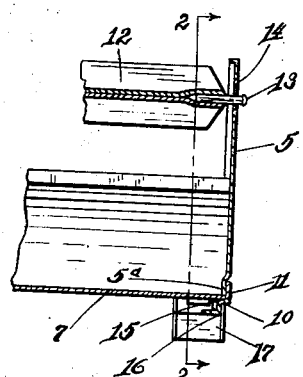
Fig. 3 is a fragmentary longitudinal sectional view upon line 3—3 of Fig. 2.

The flanges 16ª are each provided with an opening 19, through which a screw or bolt 20 may be passed, said screw or bolt being adapted to engage in a nut 20ª, that is held against turning in a pocket 21 of a stiffening web 22 (Fig. 2). This stiffening web 22 may be spot-welded to the web 15, and it is cut out as indicated at 22ˣ, to fit the shape of the trough so that in conjunction with web 15 and flanges 10, the trough is well braced and the whole structure is rendered strong and durable.

Those portions of the ends which project above the trough, as indicated at A, have their edges stiffened by inturned flanges a. The tongues 11 may be spot-welded and their seating in the recesses 5ª makes a smooth and well finished product. The positioning of the nut 20ª in a pocket formed by the stiffening web 22 gives the necessary positive engagement for the screw 20, without the necessity of employing heavy material in which to form screw threads for engagement by said screw.

By passing the screw or bolt 20 through a selected one of the openings 18 and engaging the same with the corresponding nut 20ᵃ, the channeled legs 17 may be adjusted lengthwise of the stiffening webs or flanges 16ᵃ and the height of the feeder may thereby be adjusted.

By disposing the flanges 16ᵃ and legs 17 at an angle, as illustrated in Fig. 2, the downward adjustment of the legs automatically widens the base upon which the whole structure rests, because it is clear that the longer the legs, the farther apart will be their points of contact with the floor or ground.

An important feature of construction resides in the generally ovaloid form of the trough 7 in conjunction with the inturned and converging flanges 8. By virtue of this arrangement, recesses 8ᵃ are formed, into which the feed may move when the chickens try to bill or rake the feed over the edge of the trough.

It is clear that they cannot get the grain up to the flanges 8 to rake it over the flanges until the spaces 8ᵃ are filled, and they can never get these spaces filled, because the shape of the trough is such as to cause the grain to tend to flow by gravity back toward the center of the trough. This feature results in a great saving of grain.

It will be observed that the trough is of generally oval formation in cross section and comprises a bottom and side walls, the bottom being formed upon an arc of considerably greater radius than the arcs upon which the side walls are formed. It will further be seen that the terminal upper edges of the side walls extend inwardly, or toward the center of the trough, to such an extent that these terminal end portions lie at an angle of less than 50° with respect to the horizontal. It will further be observed that the line of junction between the bottom wall and the side walls is at a point materially below the vertical center of the trough.

The net result of this is to provide a trough in the form of a relatively wide and shallow oval, rather than to form a trough that is almost circular, and deep. Thus the chickens can easily get at the feed clear to the bottom of the trough; not so much feed can be put in the trough that the residue is likely to become stale before being used; and the terminal upper edges are drawn so far inwardly of the outer edges of the side walls that the space 8ᵃ is rendered of such considerable amplitude that there is no possibility of chickens being able to rake the feed over the upper edges of the trough.

Further, it is to be noted that the general shape of the trough is such that feed remaining therein will flow to the bottom center, and there are no longitudinal recesses or pockets in which the feed can lodge until it becomes stale or moldy, or to ferment. To get a trough having the advantages set forth, I form the bottom of the same upon an arc of much greater radius than the arcs upon which the side walls are formed, the line of juncture of the side walls with the bottom wall lying well below the vertical center of the trough, and I extend the terminal upper portions of the side walls toward each other until they lie at an angle of less than 50° with respect to the horizontal.

A trough so arranged, and provided with the downwardly and inwardly directed flanges 8, provides a structure that is relatively wide and shallow but in which the grain tends to move toward the center line of the trough as the supply of grain diminishes. When the trough is nearly full, the arrangement described brings about such an overhang of the upper terminal edges of the side walls as to provide a considerable recess, as described, into which the grain may move, to thereby render it difficult for the chickens to bill the grain over the edge of the trough.

I have found that a proportion in which the bottom is formed upon an arc having a radius at least three times as great as the radius of the arcs upon which the side walls are formed, yields a trough shallow enough so that the chickens can reach all the way to the bottom to get all of the grain; of such small capacity in proportion to its width that the grain does not have a chance to get stale before it is consumed; and of such overhang of the upper portions of the side walls as to prevent the billing out of the grain. While I prefer to use a reel, the invention is not limited in this respect.

It is to be understood that the invention is not limited to the precise construction set forth, but that it includes within its purview whatever changes fairly come within either the terms or the spirit of the appended claims.

Having described my invention, what I claim is:

1. A device of the character described comprising a pair of ends of generally triangular formation, a trough of generally ovaloid formation in cross section extending between said ends and provided with tongues which pass through said ends, said ends being provided with flanges corresponding in shape to the trough and upon which the trough rests, said ends further comprising integral webs terminating in downwardly and outwardly inclined flanges at the sides of the webs, channeled leg portions fitted upon said flanges, metallic stiffening webs inwardly of the first-named webs, indented to form pockets for the reception of nuts, nuts seated in said pockets, there being an opening in each of the first-named webs in alignment with each of said nuts, and there being a row of openings in each of said channeled legs, and screws adapted to pass through the openings of the legs and through the openings of the inclined flanges and to engage in said nuts, as and for the purposes set forth.

2. A device of the character described comprising a substantially horizontal trough with curved bottom and inturned upper edges, and end pieces to which the trough is connected, said end pieces being shaped to form vertical webs having inwardly directed, integral horizontal flanges which conform to the shape of the trough and upon which the ends of the trough rest, downwardly and outwardly inclined stiffening flanges bent from the outer edges of said webs, channeled legs seated upon said flanges, and means for binding said legs in varying positions of vertical adjustment with respect to said flanges, said binding means including bolts adapted to pass through any one of a plurality of openings formed in said adjusting legs, and threaded elements carried by the flanges for engagement by said bolts.

MARION G. SLAWSON.